(12) United States Patent
Strutt et al.

(10) Patent No.: US 8,150,378 B2
(45) Date of Patent: Apr. 3, 2012

(54) DETERMINING POSITION OF A NODE BASED ON AGED POSITION DATA

(75) Inventors: Guenael T. Strutt, Sanford, FL (US); Peter B. Deoge, Orlando, FL (US); Keith J. Goldberg, Casselberry, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1131 days.

(21) Appl. No.: 11/965,460

(22) Filed: Dec. 27, 2007

(65) Prior Publication Data
US 2009/0168674 A1    Jul. 2, 2009

(51) Int. Cl.
*H04M 3/42* (2006.01)
(52) U.S. Cl. ............ 455/414.2; 455/456.2; 455/456.5
(58) Field of Classification Search .......... 455/414.2, 455/456.1, 456.6
See application file for complete search history.

(56) References Cited

U.S. PATENT DOCUMENTS

| 7,054,126 | B2 | 5/2006 | Strutt et al. | |
| 7,076,259 | B2 * | 7/2006 | Belcea | 455/456.1 |
| 2007/0224977 | A1 * | 9/2007 | Yamaguchi et al. | 455/414.2 |
| 2008/0171557 | A1 | 7/2008 | Bernard | |

FOREIGN PATENT DOCUMENTS

| EP | 1239634 A2 | 9/2002 |
| WO | WO0131965 A1 | 5/2001 |
| WO | WO2005103754 A | 11/2005 |
| WO | WO 2005103754 A1 * | 11/2005 |

OTHER PUBLICATIONS

Method System and module for locating a telecommunications termina, Machine translation of WO 2005103754 A1, Bernard et al., 17 pagesl.*
PCT Search Report Dated Mar. 16, 2009.

* cited by examiner

*Primary Examiner* — Dwayne Bost
*Assistant Examiner* — Inder Mehra
(74) *Attorney, Agent, or Firm* — Randi L. Karpinia; Daniel R. Bestor (57) ABSTRACT

Techniques are provided for determining a position of a node. For example, the node receives first position data from a first reference node and second position data from a second reference node. The second position data includes second position measurement information and a precision indicator which indicates accuracy of the second position measurement information. The node generates a timestamp which indicates when the second position data was received by node, and storing the second position data and associated timestamp. Upon receiving updated first position data at the node from the first reference node, the node determines whether updated second position data has been received from the second reference node, and if not, generates aged second position data based on the stored second position data and the associated timestamp. The node can then determine its position based on the aged second position data and the updated first position data.

17 Claims, 4 Drawing Sheets

DETERMINING POSITION OF A NODE BASED ON AGED POSITION DATA

FIELD OF THE INVENTION

The present invention relates generally to communication networks, and in particular to determining the position of a node when current position measurement information is unavailable from one or more reference nodes or sources.

BACKGROUND

An infrastructure-based wireless network typically includes a communication network with fixed and wired gateways. Many infrastructure-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and start communicating with the wired network through the new base station.

In comparison to infrastructure-based wireless networks, such as cellular networks or satellite networks, ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network. For example, as new nodes join or enter the ad hoc network, or as existing nodes leave or exit the ad hoc network.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to determining the position of a node when current position measurement information is unavailable from one or more reference nodes or sources. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one module or action from another module or action without necessarily requiring or implying any actual such relationship or order between such modules or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions determining the position of a node when current position measurement information is unavailable from one or more reference nodes or sources described herein. The non-processor circuits may include, but are not limited to, a radio receiver, a radio transmitter, signal drivers, clock circuits, power source circuits, and user input devices. As such, these functions may be interpreted as steps of a method for determining the position of a node when current position measurement information is unavailable from one or more reference nodes or sources. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 1:
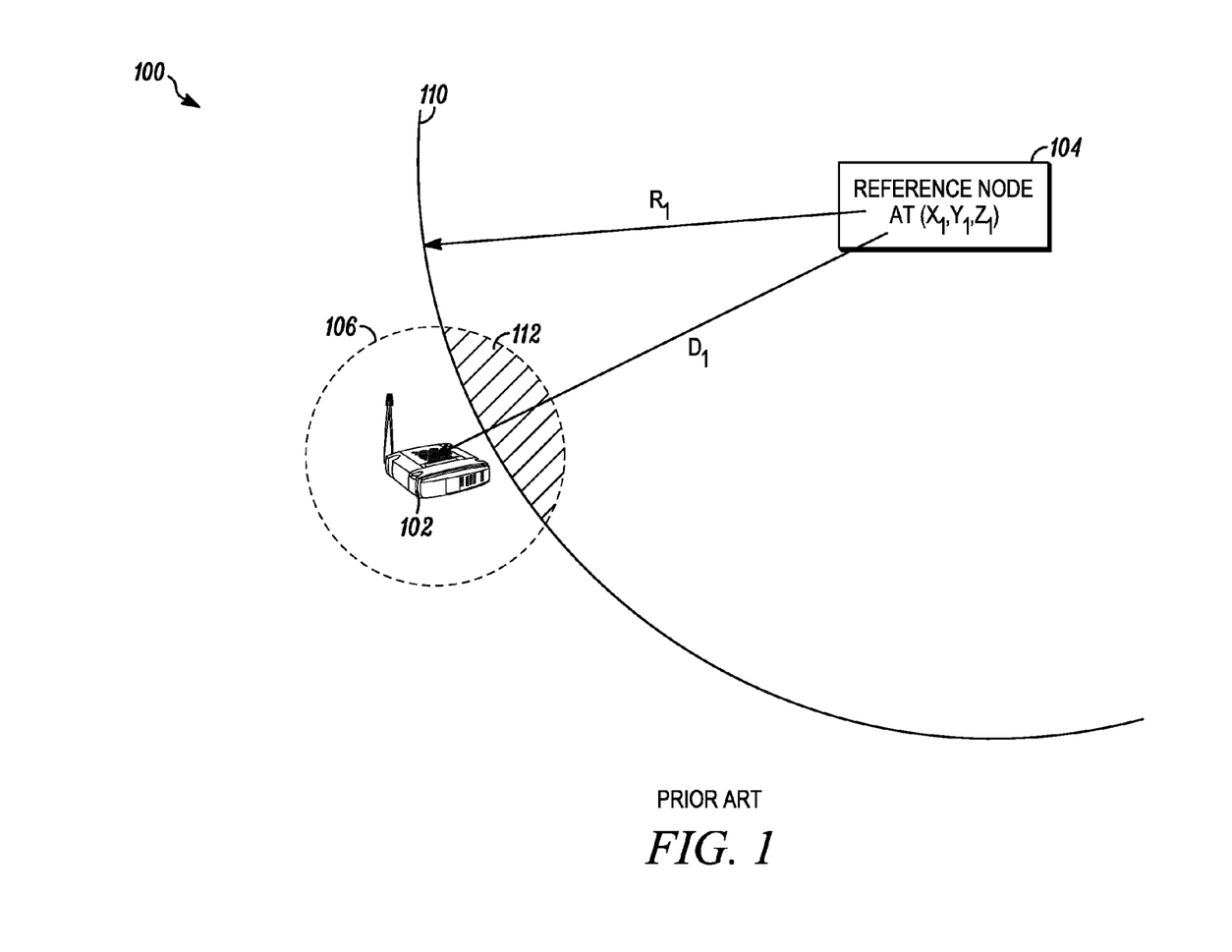
FIG. 1 is a block diagram illustrating an example of a communication network after the position of a node has been calculated based on position measurement information from reference nodes.

FIG. 1 is a block diagram illustrating an example of a communication network 100 which includes a node 102 and a reference node 104. In this example, node 102 has position information which allows node 102 to estimate its location in the network 100. For instance, in one implementation, node 102 can use GPS position information to compute an estimated location. The GPS position information will specify GPS coordinates (x, y or x, y, z) and a precision indictor that indicates the precision of those GPS coordinates. The node 102 can use the GPS coordinates (x, y or x, y, z) and the precision indictor to compute the estimated location. In this example, the estimated location is illustrated as a circle 106 that is centered at the GPS coordinates (x, y). The circle 106 has a radius, computed based on the precision indicator, which reflects the precision of the estimated location. To further refine the estimated location, the node 102 can use additional position measurement information received from other reference nodes. The node 102 can use the additional position measurement information from the other reference nodes to locate the "most probable location" of the mobile node with a certain level of accuracy.

For example, some current infrastructured-based and ad hoc networks deploy one or more fixed reference nodes 104 within the network 100. The node 102 can obtain additional position measurement information by performing ranging techniques against the fixed reference nodes. For instance, in the implementation illustrated in FIG. 1, the distance 110 between the node 102 and the reference node 104 can be determined by "ranging," or measuring the range between the node 102 and the reference node 104. Such ranging techniques can involve, for instance, use of Time of Arrival ("TOA") measurements that can provide an estimate of the distance 110 between the node 102 and a particular reference node 104. For instance, node 102 can transmit a message requesting position data to the fixed reference node 104. The fixed reference node 104 is located at a known position specified by coordinates $(X_1, Y_1, Z_1)$. It takes a time $t_1$ for the message to reach fixed reference node 104, and a time $t_2$ for the fixed reference node 104 to respond to the message with position data, which in this case is the known position, specified by coordinates $(X_1, Y_1, Z_1)$, of the fixed reference node 104. The node 102 can compute its distance $d_1$ from the fixed reference node 104 based on a velocity $(v_c)$ and the time difference $(|t_1-t_2|)$. Because there is some measurement error associated with the TOA measurement, the node 102 compensates for this measurement error by reducing the computed distance $d_1$ from the fixed reference node 104 by some margin to arrive at an estimated distance $r_1$ between the node 102 and the fixed reference node 104. The estimated distance $r_1$ can be used to define a circle 110 which is centered at the known position $(X_1, Y_1, Z_1)$ of the fixed reference node 104.

The node 102 can then compute its likely position 112 based on measurement information from the estimated location from the GPS position information and the estimated distance $r_1$ from the fixed reference node 104. The likely position 112 is the common area between the circles 106 and 110, and represents the "most probable location" of the node 102 with a certain level of accuracy. Because the likely position 112 is smaller in area than the circle 106 that reflects the estimated location from the GPS position information, the estimated position of node 102 specified by the likely position 112 has significantly better precision than the estimated location computed only from the GPS position information.

Although two methods of obtaining position information are illustrated for example purposes only, it will be appreciated that any equivalent method to identify position information of the node 102 is within the scope of the invention.

Referring again to FIG. 1, one problem with combining position estimates from multiple different reference sources (e.g., GPS position information and position information from against the fixed reference nodes) is that position determinations based on multiple different reference sources necessarily assume that the different sources are synchronous (i.e., that position measurement information from each of the different reference sources represent the location of the node 102 at the same particular point in time). In most systems, this is not always possible to achieve. As described above, the nodes in such networks are often mobile and may assume any number of random positions within the network, the different reference sources are distributed at different distances from the node 102, and network conditions or environment can vary considerably between the different reference sources and the node 102. For instance, multi-path interference can introduce measurement errors which make it difficult if not impossible to determine whether a fixed reference node 104 is actually where it is "calculated" to be.

In some cases, the node 102 may not have current position measurement information from one or more of the reference nodes, or the positioning data from one of the reference nodes may be inaccurate for some reason. This can occur, for instance, when node 102 does not have current GPS position information. This can also occur, for example, when position data from the fixed reference node 104 can not be determined (e.g., when packets are lost due to interference or when ranging exchanges have failed). When one or more of the fixed reference nodes do not respond with position data, the ranging technique will produce inaccurate results at best. In other words, the position calculation will be inaccurate (or even fail completely in some cases), and the node 102 is unable to accurately compute its current position. One approach for dealing with this problem is to simply use stored position data to compute the position. However, because the stored position data is "stale," this tends to artificially skew the computation of the node's updated position towards past values.

Overview

Techniques are provided for determining a position of a node. For example, the node receives first position data from a first reference node and second position data from a second reference node. The second position data includes second position measurement information and a precision indicator which indicates accuracy of the second position measurement information. The node generates a timestamp which indicates when the second position data was received by node, and stores the second position data and associated timestamp. Upon receiving updated first position data at the node from the first reference node, the node determines whether updated second position data has been received from the second reference node, and if not, generates aged second position data based on the stored second position data and the associated timestamp. The node can then determine its position based on the aged second position data and the updated first position data.

Figure 2:
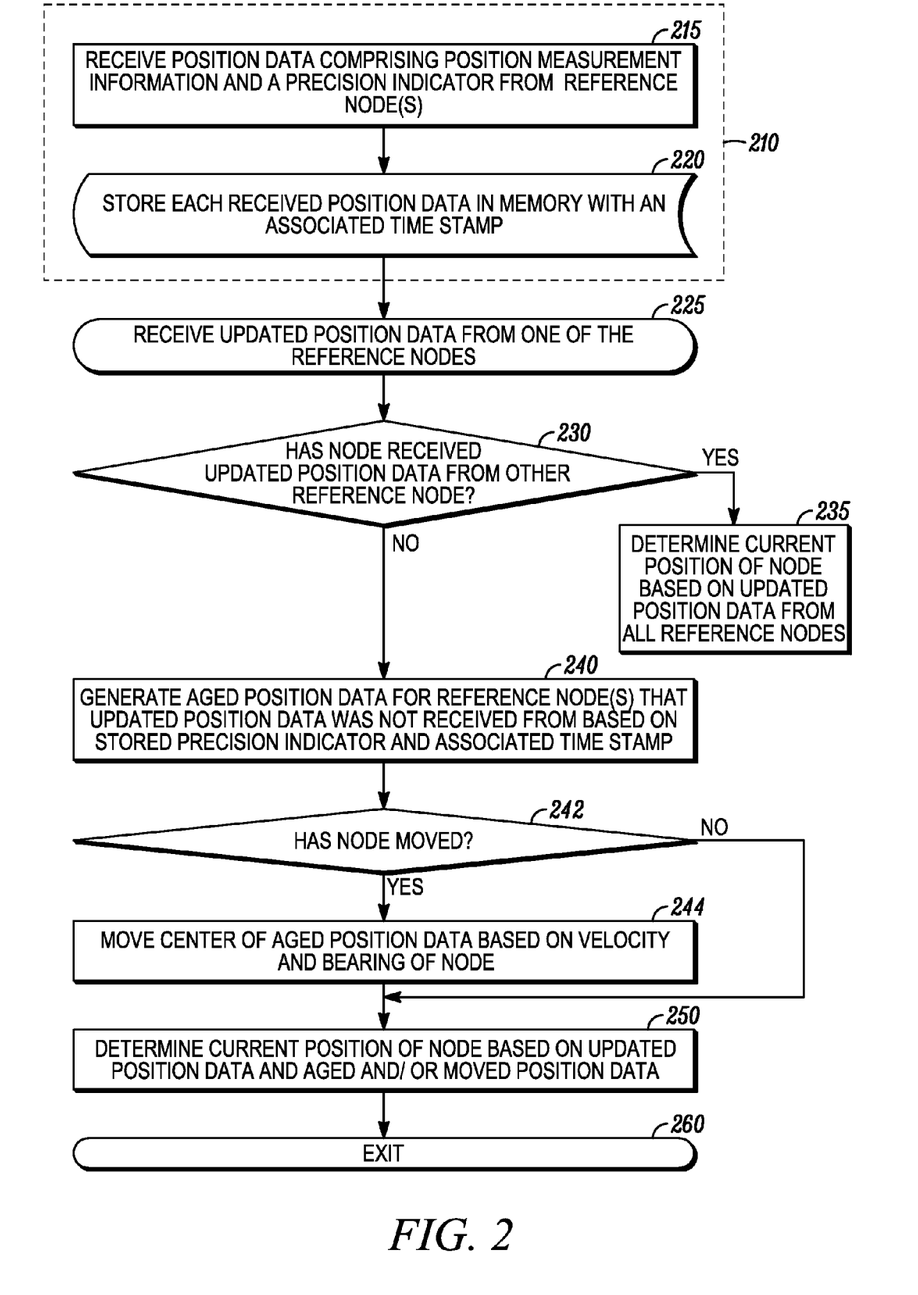
FIG. 2 is a flowchart illustrating a method for determining the position of a node when current position measurement information is unavailable from one or more reference nodes or sources in accordance with some embodiments of the present invention.

FIG. 2 is a flowchart illustrating a method for determining the position of a node when current position measurement information is unavailable from one or more reference nodes or sources in accordance with some embodiments of the present invention.

Block 210 is illustrated in a dotted-line rectangle to indicate that the enclosed steps 215 and 220 are taking place continuously when the node 102 is present in the network. At step 215, the node 102 receives position data from one or more reference nodes. The position data comprises position measurement information (e.g., distance measurements, time of arrival (TOA) information, time difference of arrival (TDOA) information, absolute coordinates, relative coordinates, and the like), and a precision indicator for each set of position data. The precision indicator indicates the measurement accuracy of the position measurement information provided for that set of position data. In general, the value of the precision indicator varies based on the type of reference node (e.g., GPS satellite, cellular base station (BTS), wireless access point (AP), mobile router), number of samples, the radio frequency (RF) environment, quality of the signal, clock precision, etc. At step 220, the node 102 stores the position data received from each of the reference nodes along with an associated timestamp which indicates when a particular set of position data was received by node 102.

The node 102 regularly receives the position data from reference nodes and uses it to compute its position in the network. In some implementations, the node's position can be represented as a position probability area (PPA) or position probability space (PPS). As used herein the term "position probability space (PPS)" refers to a zone or space where a node is likely to be located or positioned. The location or position of the node, and the precision of this location or position, are represented as a zone or space around it which reflects a region where the node is likely to be located with relative certainty or precision. The PPS represents not only the location or the position of the node, but also the accuracy or precision of that location or position. Depending on the implementation, the PPS can represent the location or position of the node a known area where the node is likely to be located or a known volume where the node is likely to be located. By representing the location or position of a node using a PPS, the location or position of the node can be expressed as a known area or volume of probability or precision instead of as a point. For example, in some implementations, the PPS represents the location or position of the node as an area or "in two-dimensional space," and this area can be expressed as a parametric function representing a discretized view of a plane. By contrast, in other implementations, the PPS represents the location or position of the node as a volume or "in three-dimensional space," and this volume can be represented as a matrix of values representing a discretized view of a space.

In some implementations, the node 102 can perform this position computation each time it receives position data from a reference node. At step 225, the node 102 receives updated position data from at least one of the reference nodes that the node 102 is relying on position data from to compute its position (e.g., PPS).

Method 200 then proceeds to step 230, where the node 102 determines whether it has received updated position data from each of the other reference nodes that the node 102 is relying on position data from to compute its position (e.g., PPS). In other words, the node 102 determines whether the position data it has from each reference node is "current" and not so aged that it is "stale."

When the node 102 determines that it has received updated position data from each of the other reference nodes that the node 102 is relying on position data from, then the method 200 proceeds to step 235 where the node 102 determines or computes its position (e.g., PPS) based on the updated position data received from each of the reference nodes that the node 102 is relying on position data from to compute its position (e.g., PPS). Step 235 would proceed in a conventional manner as indicated in FIG. 1.

As described above, sometimes one or more of the reference nodes does not provide updated position data or all reference nodes do not provide updated position data at the same time (synchronously). Steps 240-250 can provide a solution to this problem.

By contrast, when the node 102 determines that it has not received updated position data from each of the other reference nodes that the node 102 is relying on position data from, then the method 200 proceeds to step 240 where the node 102 generates "aged" position data for each of the reference nodes that did not provide updated position data. For each of the reference nodes that did not provide updated position data, the node 102 adjusts or "extrapolates" the stored precision indicator for that stored position data over time and thereby increases the error or dilute the precision of the stored position measurement information over time. For example, in some implementations, the precision of the stored precision indicator can be decreased as a function of the age of the timestamp associated with the stored position information. There are multiple ways that the precision of the stored precision indicator can be decreased as a function of the age of the PPS associated with the stored position information. For instance, in one implementation, the precision of the stored precision indicator can be linearly decreased as a function of the age of the timestamp associated with the stored position information. In another implementation, the precision of the stored precision indicator can be exponentially decayed as a function of the age of the timestamp associated with the stored position information. In other implementations, the precision of the stored precision indicator can be adjusted according to some other function based on the age of the timestamp associated with the stored position information. The error bounds for a distance measurement can be increased based on a calculated distance that the node could have traveled since the last measurement. One method is to use the historical velocity of the node. An acceleration component can be applied to the historical velocity for greater accuracy. A simpler method is to assign a maximum possible velocity to the node. It will be appreciated that any equivalent method can be utilized in accordance with the scope of the invention.

At step 242, the node 103 determines whether it has moved since the time indicated on the timestamp (i.e., the timestamp associated with the stored position information from the reference node that did not provide updated position data). When the node 103 determines that it has not moved since the time indicated on the timestamp, then the method 200 proceeds to step 250, where the node 102 determines or computes its position (e.g., PPS) based on the aged position data and the updated position data received from each of the reference nodes that provided updated position data.

By contrast, when the node 103 determines that it has moved since the time indicated on the timestamp, then the method 200 proceeds to step 244, where the node 102 moves the center of the aged position data based on the velocity and direction or "bearing" of the node 102 to generate aged and moved position data. The method 200 then proceeds to step 250, where the node 102 determines or computes its position (e.g., PPS) based on the aged and moved position data and the updated position data received from each of the reference nodes that provided updated position data.

Thus, older, stored position data can be used to fill in the gaps caused by missing updated position data. This allows for the position of the node 102 to be determined in hostile environments and to reduce the number of reference nodes that need to be contacted for any given position calculation. This also allows the position of the node 102 to be calculated in an environment where reference sources are not always available and when data collection is asynchronous. Position measurements with a known precision can be made even if all reference sources for those position measurements are not current. Specific non-limiting examples of how the method 200 of FIG. 2 can be applied in the network of FIG. 1 will now be described with reference to FIGS. 3 and 4.

Figure 3:
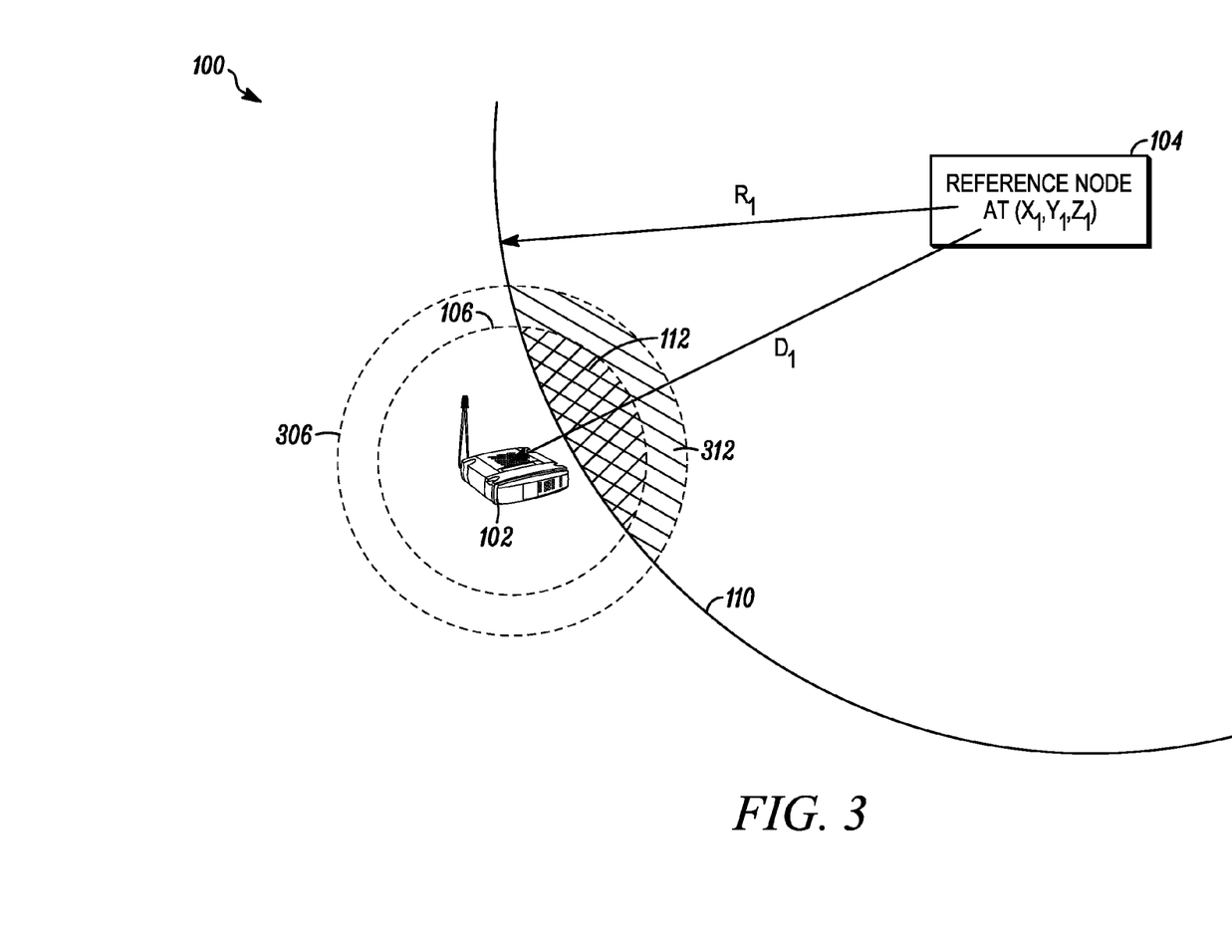
FIG. 3 is a block diagram illustrating the communication network of FIG. 1 at a later time when the node has remained stationary and has not received updated global positioning system (GPS) position information in accordance with some embodiments of the present invention.

FIG. 3 is a block diagram illustrating the communication network 100 of FIG. 1 at a later time when the node 102 has remained stationary and continues to communicate with reference node 104 and measure the range between the node 102 and the reference node 104, but has not received updated GPS position information. Thus, in this example, node 102 has not received updated position measurement information from any of the reference sources.

As in FIG. 1, the node 102 can compute the estimated distance 110 between the node 102 and the reference node 104 by "ranging," or measuring the range between the node 102 and the reference node 104. The fixed reference node 104 remains located at its known position (specified by coordinates $(X_1, Y_1, Z_1)$), and the node 102 continues to compute its distance $d_1$ from the fixed reference node 104 and compensate for measurement error by reducing the computed distance $d_1$ from the fixed reference node 104 by some margin to arrive at an estimated distance $r_1$ between the node 102 and the fixed reference node 104. The estimated distance $r_1$ can be used to define a circle 110 which is centered at the known position $(X_1, Y_1, Z_1)$ of the fixed reference node 104.

In FIG. 3, node 102 determines, based on the PPS associated with the GPS position information, that it does not have current GPS position information to use to estimate its location in the network 100. As such, the node 102 can age the stored GPS position information 106, and compute aged GPS position information 306 which can then be used by node 102 to compute an estimated location of node 102. The stored GPS position information 106 will specify GPS coordinates (x, y or x, y, z) and a precision indictor that indicates the precision of those GPS coordinates. The node 102 "ages" the stored GPS position information 106 by decreasing the precision of the stored precision indicator which in turn increases the radius of circle 106 to reflect decreased precision of the aged GPS position information 306. In one implementation, node 102 decreases the precision of the stored precision indicator based on the age of a timestamp associated with the stored GPS position information 106 to "age" the stored GPS position information 106. For example, in some implementations, the precision of the stored precision indicator can be decreased as a function (e.g., linearly decreased, exponentially decayed or adjusted according to some other function) of the age of the timestamp associated with the stored GPS position information 106. In FIG. 3, this corresponds to an increase in radius of the circle 306 which represents the aged GPS position information. In FIG. 3, the aged GPS position information is indicated by circle 306 which has an increased radius. Because the node 102 has not moved since it received the stored GPS position information 106, the circle 306 remains centered at the location of the stored GPS coordinates (x, y, or alternatively x, y, z if the GPS location is represented in three-dimensional space as opposed to two-dimensional space).

Thus, even though node 102 has not received updated GPS position information, the node 102 can still compute an updated position probability space (PPS) 312 based on the stored GPS position information and the estimated distance $r_1$ from the fixed reference node 104. The PPS 312 will be the common area between the circles 306 and 110. Because the PPS 312 is smaller in area than the circle 306 that reflects the estimated location from the stored GPS position information, the estimated position of node 102 specified by the PPS 312 has significantly better precision than the estimated location computed only from the stored GPS position information. The PPS 312 is larger than the prior PPS 112 since the stored GPS position information is presumed to be less accurate due to its "age." This approach is better than simply using the "stale" or stored GPS position information as the precision of the aged GPS position information is less biased towards past values.

The scenario described with reference to FIG. 3 assumes that the node 102 is stationary. However, in many cases, the node 102 will be moving or "mobile." Techniques for handling such scenarios will be described with reference to FIG. 4.

Figure 4:
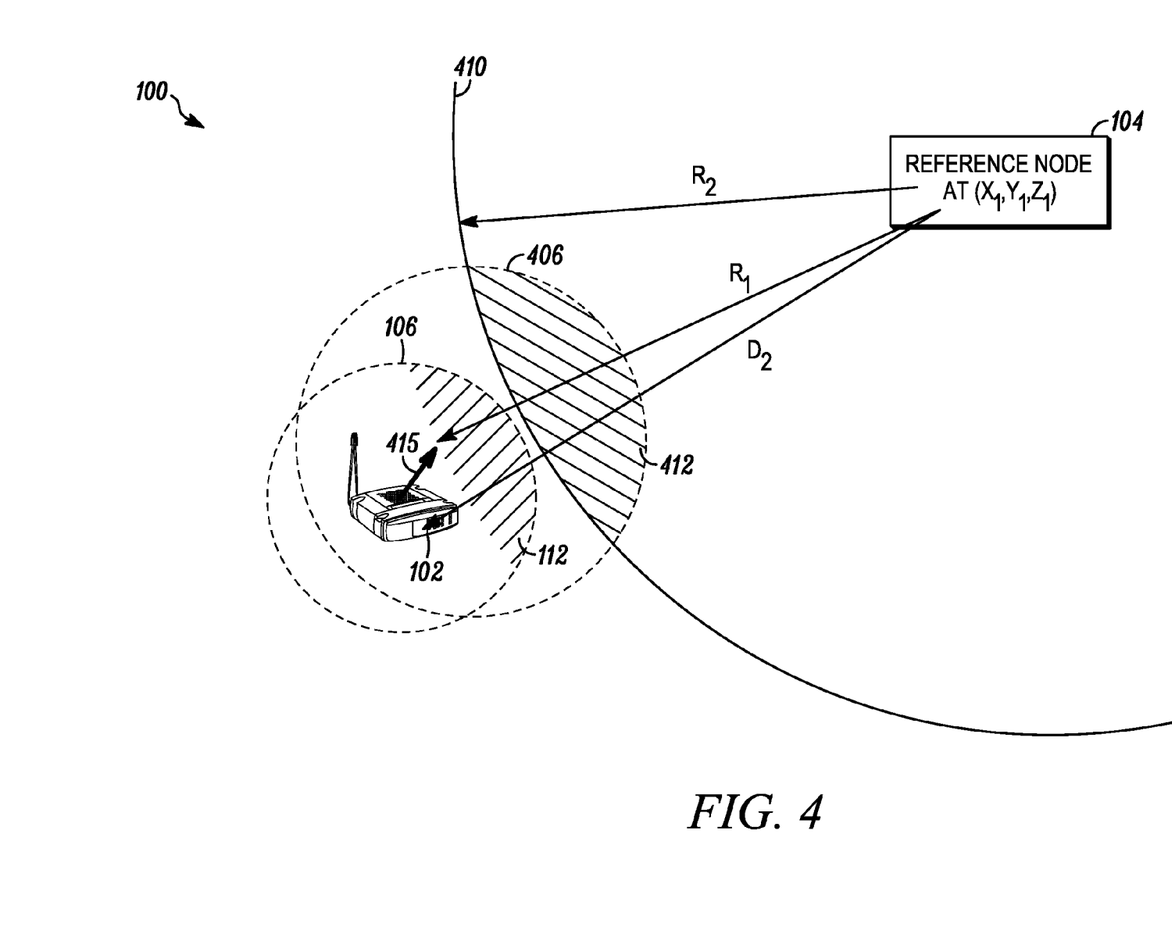
FIG. 4 is a block diagram illustrating the communication network of FIG. 1 at another later time when the node is mobile and has not received updated GPS position information in accordance with some other embodiments of the present invention.

FIG. 4 is a block diagram illustrating the communication network 100 of FIG. 1 at another later time when the node 102 has moved (or is currently moving) and continues to communicate with reference node 104 and measure the range between the node 102 and the reference node 104, but once again has not received updated GPS position information. In this example, node 102 has received updated position measurement information from one of its reference sources.

The node 102 can compute the estimated distance 410 between the node 102 and the reference node 104 by "ranging," or measuring the range between the node 102 and the reference node 104. The mobility of node 102 can be determined, for instance, based on an Inertial Navigation System (INS), and in this example, the mobility of the node 102 is indicated by vector 415 which indicates the velocity and direction or bearing of the node 102. In this example, fixed reference node 104 remains located at its known position (specified by coordinates $(X_1, Y_1, Z_1)$), but because node 102 is moving (or has moved), the node 102 now computes a different distance $d_2$ from the fixed reference node 104 and compensates for measurement error by reducing the computed distance $d_2$ from the fixed reference node 104 by some margin to arrive at an estimated distance $r_2$ between the node 102 and the fixed reference node 104. As such, the estimated distance $r_2$ between the node 102 and the fixed reference node 104 will be different than in FIG. 1. The As above, the estimated distance $r_2$ can be used to define a circle 110 which is centered at the known position $(X_1, Y_1, Z_1)$ of the fixed reference node 104.

In FIG. 4, node 102 once again determines, based on the PPS associated with the GPS position information, that it does not have current GPS position information to use to estimate its location in the network 100. As such, the node 102 can age the stored GPS position information 106, and compute aged GPS position information.

The stored GPS position information 106 will specify GPS coordinates (x, y or x, y, z) and a precision indictor that indicates the precision of those GPS coordinates. The node 102 "ages" the stored GPS position information 106 by decreasing the precision of the stored precision indicator which in turn increases the radius of circle 106 to reflect decreased precision of the aged GPS position information 306. In one implementation, node 102 decreases the precision of the stored precision indicator based on the age of a timestamp associated with the stored GPS position information 106 to "age" the stored GPS position information 106. For example, in some implementations, the precision of the stored precision indicator can be decreased as a function (e.g., linearly decreased, exponentially decayed or adjusted according to some other function) of the age of the timestamp associated with the stored GPS position information 106. In FIG. 4, this corresponds to an increase in radius of the circle 306 which represents the aged GPS position information. In FIG. 4, the aged GPS position information is indicated by circle 306 which has an increased radius.

In addition, the node 102 determines that is has moved (or is moving) since the stored GPS position information was stored, and can therefore use its mobility information and/or the timestamp to compute moved GPS coordinates (x1, y1) for the aged GPS position information to generate aged/moved GPS position information 406. In other words, because the node 102 has moved since it received the stored GPS position information 106, center of the circle 406 should be moved from the location of the stored GPS coordinates (x, y, or alternatively x, y, z if the GPS location is represented in three-dimensional space as opposed to two-dimensional space) to a new location. The aged/moved GPS position information 406 can then be used by node 102 to compute an estimated location of node 102.

Thus, even though node 102 has not received updated GPS position information and has moved since receiving its stored GPS position information, the node 102 can still compute an updated position probability space (PPS) 412 based on the stored GPS position information, mobility of the node 102 and the estimated distance $r_2$ from the fixed reference node 104. The PPS 412 will be the common area between the circles 406 and 410.

The PPS 412 is larger than the prior PPS 112 since the stored GPS position information is presumed to be less accurate due to its "age." This approach is better than simply using the "stale" or stored GPS position information. For example, if the node 102 simply tried to rely on the stored GPS position information (circle 106) and ranging information (circle 410), there would be no intersection between circles 106, 410, and the position calculation would fail completely. By taking into account the "age" of the stored GPS position information as well as the mobility of node 102, the PPS 412 can provide a good estimate of the "most probable location" of the node 102 with a certain level of accuracy.

Although embodiments are described above in the context of a node that determines its position by use of GPS measurement information and position information obtained via ranging techniques, it will be appreciated by those skilled in the art that embodiments can also be applied in the context of other position determination technologies, such as, position determination technologies based on received signal strength indicator (RSSI) measurements, TDOA-based position determination technologies, RFID-based position determination technologies, etc.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for determining a position of a node, the method comprising:
   receiving first position data at the node from a first reference node and second position data from a second reference node, wherein the second position data comprises second position measurement information and a precision indicator which indicates accuracy of the second position measurement information;
   generating a timestamp at the node which indicates when the second position data was received by node, associating the timestamp with the second position data and storing the second position data and associated timestamp at the node;
   receiving updated first position data at the node from the first reference node;
   determining, at the node, whether updated second position data has been received from the second reference node;
   generating, at the node when the node determines that it has not received updated second position data from the second reference node, aged second position data by decreasing the precision indicator of the stored second position data as a function of an amount of time that has passed since a time indicated by the associated timestamp; and
   determining a position of the node using both the aged second position data and the updated first position data.

2. A method according to claim 1, wherein the step of decreasing the precision indicator of the stored second position data as a function of the amount of time that has passed since the time indicated by the associated timestamp comprises linearly decreasing the precision of the stored precision indicator as a function of the amount of time that has passed since the time indicated by the associated timestamp.

3. A method according to claim 1, wherein the step of decreasing the precision indicator of the stored second position data as a function of the amount of time that has passed since the time indicated by the associated timestamp comprises exponentially decaying the precision of the stored precision indicator as a function of the amount of time that has passed since the time indicated by the associated timestamp.

4. A method according to claim 1, further comprising:
   determining, at the node, whether the node has moved since the time indicated by the associated timestamp; and
   adjusting, when the node determines that the node has moved since the time indicated by the associated timestamp, a center position of the aged second position data based on a detected motion of the node to generate aged and moved second position data.

5. A method according to claim 4, wherein the step of determining a position of the node using both the aged second position data and the updated first position data, comprises:
   determining a position of the node using both (i) the aged and moved second position data and (ii) the updated first position data.

6. A method according to claim 1, wherein determining the position of the node using both the aged second position data and the updated first position data comprises determining a geographic area comprising an intersection between the aged second position data and the updated first position data.

7. A node, comprising:
   a receiver configured to receive first position data at the node from a first reference node and second position data from a second reference node, wherein the second position data comprises second position measurement information and a precision indicator which indicates accuracy of the second position measurement information;
   a processor configured to generate a timestamp which indicates when the second position data was received by node and associate the timestamp with the second position data;
   a memory configured to store the second position data and associated timestamp;

wherein the receiver is further configured to receive updated first position data from the first reference node, and wherein the processor is further configured to determine whether updated second position data has been received from the second reference node, generate aged second position data by decreasing the precision indicator of the stored second position data as a function of an amount of time that has passed since a time indicated by the associated timestamp when the updated second position data has not been received, and determine a position of the node using both the aged second position data and the updated first position data.

8. A node according to claim 7, wherein the processor is configured to decrease the precision indicator of the stored second position data as a function of the amount of time that has passed since the time indicated by the associated timestamp by linearly decreasing the precision of the stored precision indicator as a function of the amount of time that has passed since the time indicated by the associated timestamp.

9. A node according to claim 7, wherein the processor is configured to decrease the precision indicator of the stored second position data as a function of the amount of time that has passed since the time indicated by the associated timestamp by exponentially decaying the precision of the stored precision indicator as a function of the amount of time that has passed since the time indicated by the associated timestamp.

10. A node according to claim 7, further comprising:
a system designed to provide information regarding a detected motion of the node; and
wherein the processor is further configured to, when the node has moved since the time indicated by the associated timestamp, adjust a center position of the aged second position data based on the detected motion of the node to generate aged and moved second position data, and to determine a position of the node using both (i) the aged and moved second position data and (ii) the updated first position data.

11. A node according to claim 7, wherein the processor is configured to determine the position of the node using both the aged second position data and the updated first position data by determining a geographic area comprising an intersection between the aged second position data and the updated first position data.

12. A method for determining a position of a node based on position data received from reference nodes, the method comprising:
receiving position data at the node from each of the reference nodes, wherein the position data from each node comprises position measurement information and a precision indicator;
generating a timestamp at the node for the position data from each node, and storing the position data and associated timestamps at the node;
determining, at the node upon receiving updated position data from one of the reference nodes, whether the node has received other updated position data from the other reference nodes;
generating, at the node, aged position data for each reference node that the node has not received updated position data from by decreasing the respective precision indicator of each aged position data for each reference node that the node has not received updated position data from as a function of an amount of time that has passed since a respective time indicated by the associated timestamp; and
determining a position of the node using both the aged position data and the updated position data.

13. A method according to claim 12, further comprising:
determining, at the node, whether the node has moved since the time indicated by the timestamp associated with that stored precision indicator by detecting motion of the node; and
adjusting, when the node determines that the node has moved, a center position of the aged position data based on the detected motion of the node to generate aged and moved position data.

14. A method according to claim 13, wherein the step of determining a position of the node, comprises:
determining a position of the node based on both of (i) the aged and moved position data and (ii) the updated position data.

15. A method according to claim 12, wherein determining the position of the node using both the aged position data and the updated position data comprises determining a geographic area comprising an intersection between the aged position data and the updated position data.

16. A node, comprising:
a receiver designed to receive position data from different reference sources at different times, wherein the position data comprises: position measurement information and an associated precision indicator;
a memory designed to store the position data with an associated timestamp indicating a time at which the position data was received;
a processor designed to:
extrapolate the position measurement information based on the timestamp to generate extrapolated position data, wherein the extrapolated position data represents the stored position data extrapolated to a current time by (i) decreasing the associated precision indicator of at least one received position data as a function of an amount of time that has passed since a time indicated by the associated timestamp and (ii) adjusting a center position of at least one received position data as a function of a detected motion of the node; and
compute a position of the node based on the extrapolated position data.

17. The node according to claim 16, wherein the processor is configured to compute the position of the extrapolated position data by determining a geographic area comprising an intersection between at least one extrapolated position data and at least one received position data.

* * * * *

UNITED STATES PATENT AND TRADEMARK OFFICE
CERTIFICATE OF CORRECTION

PATENT NO. : 8,150,378 B2
APPLICATION NO. : 11/965460
DATED : April 3, 2012
INVENTOR(S) : Strutt et al.

It is certified that error appears in the above-identified patent and that said Letters Patent is hereby corrected as shown below:

On the title page, item (75), under "Inventors" in Column 1, Line 2, delete "Peter B. Deoge" and insert -- Peter B. Doege --, therefor.

On the title page, item (56), under "OTHER PUBLICATIONS" in Column 2, Line 3, delete "pagesl." and insert -- pages. --, therefor.

Signed and Sealed this
First Day of January, 2013

David J. Kappos
*Director of the United States Patent and Trademark Office*